United States Patent [19]
Kopetschke

[11] 3,820,371
[45] June 28, 1974

[54] METHOD FOR ROLL-FORMING OF RIBBED PIPES

[75] Inventor: Alfred Kopetschke, Am Langen Bach near Voehringen/Iller, Germany

[73] Assignee: Wieland-Werke AG, Postfach, Germany

[22] Filed: Dec. 8, 1972

[21] Appl. No.: 313,424

[52] U.S. Cl. ................................ 72/98, 72/100
[51] Int. Cl. ............................... B21h 3/12
[58] Field of Search ............ 72/14, 98, 100, 443; 29/157.3

[56] References Cited
UNITED STATES PATENTS
1,498,102  6/1924  Farkell et al. .................... 72/14
3,327,512  6/1967  Novak et al. .................... 72/98

Primary Examiner—Lowell A. Larson
Attorney, Agent, or Firm—Woodhams, Blanchard and Flynn

[57] ABSTRACT

A method for roll-forming ribs onto pipes wherein at least the ends of the pipes are free of ribs. The ribbed pipes are rotated by driven roller disks due to a frictional engagement therewith and the pipes are moved forwardly due to a skewed relationship between the pipe and the roller disks. This invention is particularly characterized by the roller disks being driven at a lower speed of rotation during an in-feed operation and increased to an optimum operating rotational speed after the in-feed operation has been completed. The reduction in rotational speed on the roller disks depends on the material which is to be worked and is approximately one-fourth to one-third of the optimum operating rotational speed.

4 Claims, 3 Drawing Figures

PATENTED JUN 28 1974　　3,820,371

METHOD FOR ROLL-FORMING OF RIBBED PIPES

The invention relates to a method for rolling of ribbed pipes wherein at least the end portions are non-ribbed and the pipes are rotated advantageously by driven roller disks due to friction and the pipes moved forwardly due to a skewed relationship between the pipes and the roller disks.

It is already known to use for the manufacture of ribbed pipes tools of several round roller disks with various diameters which are driven at an optimum operating rotational speed for the rolling operation and are fed in radial direction toward the horizontal pipe axis. During contact of the roller disk with the pipe wall, rotation of the disks and thereby the pipe occurs and therewith the forward movement of the pipe. At a further in-feed of the roller disks the pipe ribs are formed. During the rolling operation, the roller disks are arranged in such a manner that, seen in feed direction of the pipe during the rolling operation, the roller disk having the smallest diameter engages first and the roller disk having the largest diameter engages last.

Thus, the roller disks having the smallest diameters have to carry out the first deformation and are constructed in such a manner that they can carry out a large deformation, while the last largest roller disks have to take over more the smooth rolling. However, if pipes are manufactured in which nonribbed pipe sections are needed, the roller disks must be fed in and back.

During feeding in of the rolling tools, the roller disk having the largest diameter first contacts the pipe. This roller disk, which actually is intended only for smooth rolling, must now assume the greatest deforming operation. Furthermore a further stress on the largest roller disk exists because of the following situation:

During the in-feed, the pipe, which depending on its dimensions has a more or less great inertia, must be rotated.

Moreover, it has been proven that pipes which must be rolled can sometimes not be manufactured completely without any mistakes. It is easily possible to manufacture smooth pipes which macroscopically are without any mistakes, which have a high resistance against internal pressures, etc. If, however, such pipes are supposed to be deformed to ribbed pipes and if thereby extreme deformations are used, for example, very high ribs, it is often discovered that the smooth pipe is not suitable herefor.

According to experience, the starting pieces of the ribbed pipe are mainly endangered. The starting pieces which are provided with ribs of various heights are created during the start of each operation (at the end of the operation mirror-picturelike) and extend from the smooth pipe portion to the first complete pipe rib which is created after in-feed of the roller disks has occurred. Rolled ribbed pipes are preferably requested in a form in which the end or the ends and the intermediate pieces are nonribbed.

The mistakes at the points effected by the starting piece can result in the finished ribbed pipe having cracks over a longer stretch of the ribs. These cracks can extend to the core, even into the inside of the pipe so that the pipe will break during the deformation process and be unusable. As a further disadvantage in rolling of ribbed pipes, the large roller disk wears and roller disk breakage must also be considered.

In order to avoid the high roller disk wear, particularly on the largest roller disk, an apparatus is known, the subject matter of which is an electromagnetic reducing mechanism for reducing the pipe diameter. The pipe, which must be provided with ribs, is thereby reduced in diameter over a mandrel, namely, by means of a reducing mechanism which is operated by a magnetic field. After the radial in-feed of the rolling tool occurs, a subsequent axial feed occurs after the tool contacts the pipe to begin the rolling operation. However, this operation requires an additional operation and requires a considerable expense for equipment.

The basic purpose of the invention is to avoid the generation of large amounts of waste during rolling of ribbed pipes and without the requirement for additional apparatus and to achieve in a simple manner a reduced wear on the roller disks.

This purpose is attained according to the invention in such a manner that with the start and during the in-feed of the roller disks into the pipe wall, the operating rotational speed of the roller disks is reduced and after finishing the in-feed operation is again increased to the optimum operating rotational speed for the rolling operation. The reduced operating rotational speed is, depending on the material to be worked, approximately ¼ to ⅓ of the optimum operating rotational speed. By reducing the operating rotational speed of the roller disks and thus of the carried pipe, the pipe mistakes at the starting parts are surprisingly mostly avoided which is due possibly to the fact that the deforming speed and the deforming work remains below the limit which is critical for the creation of pipe fields.

Furthermore, it has been proven that the roller disk wear and roller disk breakage is greatly reduced. This is probably the case because the large roller disk, during driving in under a reduced operating rotational speed, needs to apply only a correspondingly smaller frictional force onto the pipe in order to accelerate the pipe to the rotational speed.

A further advantage of the invention consists in that through the inventive method the length of the transition piece between smooth and ribbed pipe can be shortened because the in-feed speed of the roller disks takes place in radial direction of the pipe independent of the rotation of the roller disks so that the reduced operating rotational speed leads to a correspondingly reduced axial pipe feed during the in-feed.

In connection with the drawings which illustrate the arrangement of the roller disks, one exemplary embodiment of the invention will be described more in detail hereinafter:

Figure 1:
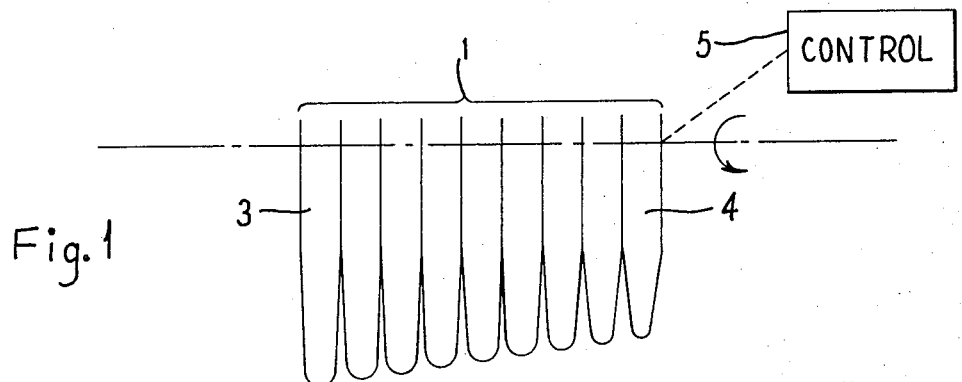
FIG. 1 illustrates a radial in-feed operation of a tool set composed of roller disks at the moment of contact with the largest diameter roller disk.
Figure 2:
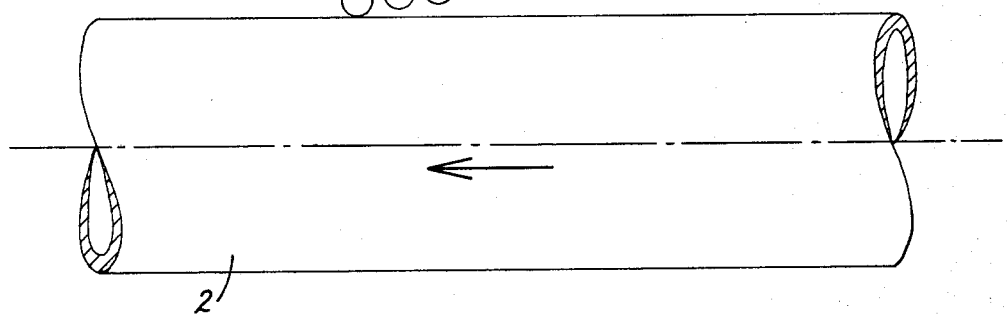
FIG. 2 illustrates the end of the in-feed operation.
Figure 3:
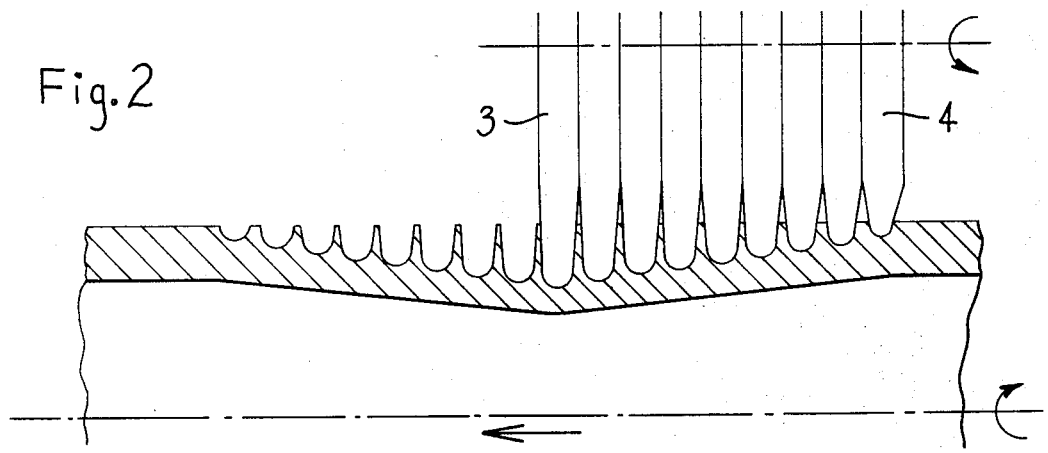
FIG. 3 illustrates the roller disks during the rolling operation.

The driven roller sets 1, which are illustrated in FIGS. 1, 2 and 3 and which are mounted around the pipe 2 at a certain distance on the pipe periphery, consists of several roller disks which represent the tool.

Simultaneously with the start of the machine, the radial in-feed of the roller disks is turned on. The roller disk 3 having the largest diameter contacts first the nonribbed, namely, the nonworked portion of the pipe.

Said roller disk 3, which is actually intended only for smooth rolling, must now carry out the greatest deforming operation and furthermore must rotate the pipe. Once the radial in-feed is finished (FIG. 2), by operation of a suitable limit switch an impulse is sent through a conventional control and regulating mechanism 5 which permits the rotational speed of the machine to speed up to the optimum predetermined operating rotational speed.

Now, as can be seen from FIG. 3, the roller disk 4 having the smallest diameter carries out the first deformation, while the roller disk 3 with the largest diameter engages last, seen in in-feed direction of the pipe 2.

The embodiments of the invention in which exclusive property or privilege is claimed are defined as follows:

1. A method for roll forming a ribbed pipe wherein at least the ends are nonribbed, said ribbed pipe being rotated by a plurality of driven roller disks due to a frictional engagement therebetween, said roller disks being skewedly positioned relative to said pipe for effecting a simultaneous axial forward movement of said pipe, comprising the steps of rotating and simultaneously feeding in said roller disks into engagement with the pipe wall, controlling the operating rotational speed of said roller disks so that said rotational speed is low during said feeding in operation and after completion of said feeding in operation, said rotational speed is increased to an optimum operating rotational speed.

2. A method according to claim 1, wherein said low operating rotational speed is in the range of ¼ to ⅓ of said optimum operating rotational speed.

3. A method according to claim 2, wherein said feeding in operation includes the step of moving the largest diameter finishing disk of a series of progressively decreasing diameter disks connected side-by-side into first engagement with said pipe wall.

4. A method according to claim 3, wherein after said feeding in operation, forming the initial rib on said pipe wall by the smallest of said disks while said roller disks are rotating at said optimum rotational speed.

* * * * *

UNITED STATES PATENT OFFICE
CERTIFICATE OF CORRECTION

Patent No. 3,820,371               Dated  June 28, 1974

Inventor(s)  Alfred Kopetschke

It is certified that error appears in the above-identified patent and that said Letters Patent are hereby corrected as shown below:

Change the address of the Assignee WIELAND-WERKE AG to -- Ulm, Germany --.

The drawing beneath the "Abstract of the Disclosure" should read as shown below:

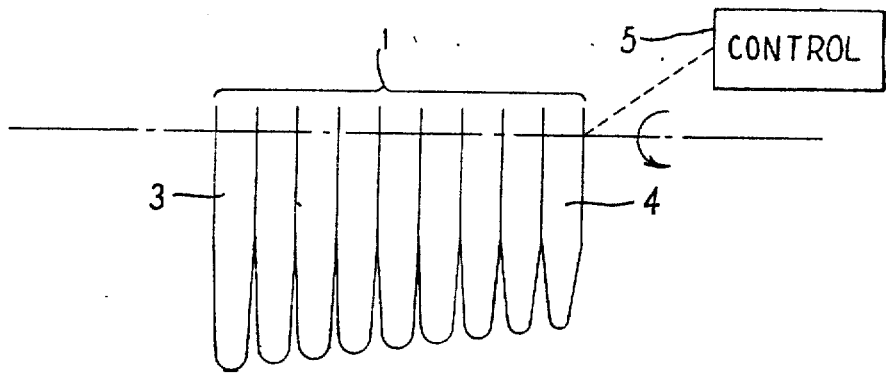

Signed and sealed this 27th day of May 1975.

(SEAL)
Attest:

RUTH C. MASON
Attesting Officer

C. MARSHALL DANN
Commissioner of Patents
and Trademarks